(12) United States Patent
Wiik et al.

(10) Patent No.: US 10,656,300 B2
(45) Date of Patent: May 19, 2020

(54) INVERSION METHOD

(71) Applicant: STATOIL PETROLEUM AS, Stavanger (NO)

(72) Inventors: Torgeir Wiik, Trondheim (NO); Eirik Øverland Dischler, Trondheim (NO); Janniche Iren Nordskag, Buvika (NO); Anh Kiet Nguyen, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

(21) Appl. No.: 15/110,352

(22) PCT Filed: Jan. 8, 2014

(86) PCT No.: PCT/EP2014/050247
§ 371 (c)(1),
(2) Date: Jul. 7, 2016

(87) PCT Pub. No.: WO2015/104052
PCT Pub. Date: Jul. 16, 2015

(65) Prior Publication Data
US 2016/0334532 A1    Nov. 17, 2016

(51) Int. Cl.
*G01V 3/08*    (2006.01)

(52) U.S. Cl.
CPC ........ *G01V 3/083* (2013.01); *G01V 2003/086* (2013.01)

(58) Field of Classification Search
CPC ..... G01V 3/38; G01V 3/083; G01V 2003/086
See application file for complete search history.

(56) References Cited

U.S. PATENT DOCUMENTS

| | | | | |
|---|---|---|---|---|
| 4,679,174 A | * | 7/1987 | Gelfand | G01V 1/282 367/38 |
| 2011/0264421 A1 | * | 10/2011 | Jing | G01V 3/38 703/2 |

OTHER PUBLICATIONS

Abubakar et al., "2.5D forward and inverse modeling for interpreting low-frequency electromagnetic measurements", Geophysics, Jul.-Aug. 2008, vol. 73, No. 4, pp. F165-F177.
Brown et al., "Seismically regularized controlled-source electromagnetic inversion", Geophysics, Jan.-Feb. 2012, vol. 77, No. 1, pp. E57-E65.
International Search Report, issued in PCT/EP2014/050247, dated Sep. 29, 2014.
Written Opinion of the International Searching Authority, issued in PCT/EP2014/050247, dated Sep. 29, 2014.

(Continued)

*Primary Examiner* — Kyle R Quigley
(74) *Attorney, Agent, or Firm* — Birch, Stewart, Kolasch & Birch, LLP

(57) ABSTRACT

A method of estimating electromagnetic parameters of a geological structure, comprising: providing controlled source electromagnetic, CSEM, data of the structure, calculating a numerical model representing electromagnetic parameters of the structure and generating simulated CSEM data, discretising the numerical model based on prior knowledge of the structure, defining a functional for minimising the distance between said simulated CSEM data and said CSEM data, wherein the functional comprises a regularisation term which depends on prior knowledge of said structure.

4 Claims, 16 Drawing Sheets

(56) References Cited

OTHER PUBLICATIONS

Chinese Office Action and Search Report dated Dec. 26, 2018 for Application No. 201480076724.2, along with an English translation.
Ertekin et al., "Applied Reservoir Simulation", Petroleum Industry Press, 5 pages, Feb. 2004.

* cited by examiner

INVERSION METHOD

TECHNICAL FIELD

The present invention relates to subsurface geological exploration methods and inversion of electromagnetic data.

BACKGROUND

Subsurface geological structures can be explored with a plurality of detection methods. The detection methods can be used to infer the presence of hydrocarbons in a formation. Two examples of detection methods are seismic methods and electromagnetic methods. Seismic methods are based on the detection of elastic waves which travel through a formation. Electromagnetic methods are based on the detection of electromagnetic waves which propagate through a formation. A specific example of an electromagnetic method is the detection of marine controlled source electromagnetic (mCSEM) data. In this method, a vessel tows a dipole source through the seawater which emits a time-varying electromagnetic field into the earth. This field propagates through the formation and is detected by a plurality of sensors which are placed on the seabed or also towed behind a vessel. After the mCSEM data have been collected by the sensors, the data need to be interpreted or inverted to extract information about the formation from the data. One way of inverting the data is using a numerical model to generate a simulated data set. If the model perfectly represents the formation and the propagation of the electromagnetic field through the formation, the simulated data will be identical to the measured data. The estimation of the optimal model can be formulated as an optimisation problem in which the distance between the real data and the simulated data is minimised. However, the inversion problem is a highly non-unique problem with many possible solutions and is ill-posed in the Hadamard sense. This may lead to un-physical results of the inversion and corresponding difficulties in interpretation. In order to address this problem, a regularisation term can be included in the optimisation problem. A spatially uniform smoothing parameter may be included in the horizontal and vertical directions of the formation.

Some methods use a Tikhonov type regularization (Tikhonov, A. N. et al., 1977, Solutions of ill-posed problems; W.H. Winston and Sons.) where additional penalties are included linearly into the cost functional. The penalties are designed to enforce certain properties in the inverted resistivity profile, and narrows down the kernel of the problem. This approach was taken, for example, by Zhdanov, et al. (SEG technical Program Expanded Abstracts, 26, F65-F76). However, this term needs to be weighted properly so that the regularizing information and the data information balance each other. A different approach was taken by Abubakar et al. (Geophysics, 73, F165-F177), where the regularizing term was included multiplicatively in the cost functional, thus eliminating the estimation of the trade-off between the different terms in the cost functional. For both approaches, however, the regularization is uniform smoothing, whereby smoothing operators are applied along the horizontal and vertical directions, thus ensuring a slowly varying resistivity profile in the inverted result.

STATEMENT OF INVENTION

According to a first aspect of the invention, there is provided a method of estimating electromagnetic parameters of a geological structure, comprising: providing controlled source electromagnetic, CSEM, data of the structure, calculating a numerical model representing electromagnetic parameters of the structure and generating simulated CSEM data, discretising the numerical model based on prior knowledge of the structure, defining a functional for minimising the distance between said simulated CSEM data and said CSEM data, wherein the functional comprises a regularisation term which depends on prior knowledge of said structure.

The electromagnetic parameters may be the conductivity of the geological structure at a plurality of locations of the structure. The regularisation term may have a strength which depends on the location of the structure and may comprise a plurality of weights corresponding to a plurality of geological locations, wherein some of the locations are defined with more confidence than other locations, and wherein locations defined with more confidence may be assigned higher weights than locations with less confidence.

The regularisation term may comprise a plurality of weights corresponding to a plurality of geological locations, wherein the weights which are assigned to locations with horizons passing through them are lower than weights assigned to locations without horizons passing through them. The prior knowledge may comprise seismic survey data.

According to a second aspect of the invention, there is provided a method of estimating electromagnetic parameters of a geological structure, comprising providing controlled source electromagnetic, CSEM, data of the structure, calculating a numerical model representing parameters of the structure and generating simulated CSEM data, discretising the numerical model based on prior knowledge of the structure, defining a functional for minimising the distance between said simulated CSEM data and said CSEM data, wherein the functional comprises terms correlating neighbouring geological locations in dependence on prior knowledge of said structure.

The step of correlating may depend on the presence of a structural gradient estimated from prior knowledge of said structure. The method may further comprise defining a first spatial direction in the tangential plane of said structure and a second spatial direction perpendicular to the tangential plane of said structure. A high correlation may be assigned to neighbouring locations in the first spatial direction and a low correlation may be assigned to neighbouring locations in the second spatial direction.

The prior knowledge may comprise seismic survey data. The electromagnetic parameters may be the conductivity of the geological structure at a plurality of locations of the structure. The first and second spatial directions may be chosen according to said step of discretising the numerical model.

According to a third aspect of the invention, there is provided a computer device comprising: a receiver for receiving controlled source electromagnetic, CSEM, data of a geological structure; a processor arranged to carry out the method according to the first or second aspect of the invention.

According to a fourth aspect of the invention, there is provided a computer program comprising non-transitory computer readable code which, when run on a computer device, causes the computer device to behave as a computer device according to the third aspect of the invention.

According to a fifth aspect of the invention, there is provided a computer program product comprising a non-transitory computer readable medium and a computer program according to the fourth aspect of the invention, wherein the computer program is stored on the non-transitory computer readable medium.

BRIEF DESCRIPTION OF THE DRAWINGS

Some embodiments of the invention will now be described by way of example only and with reference to the accompanying drawings, in which.

DETAILED DESCRIPTION

Figure 1:
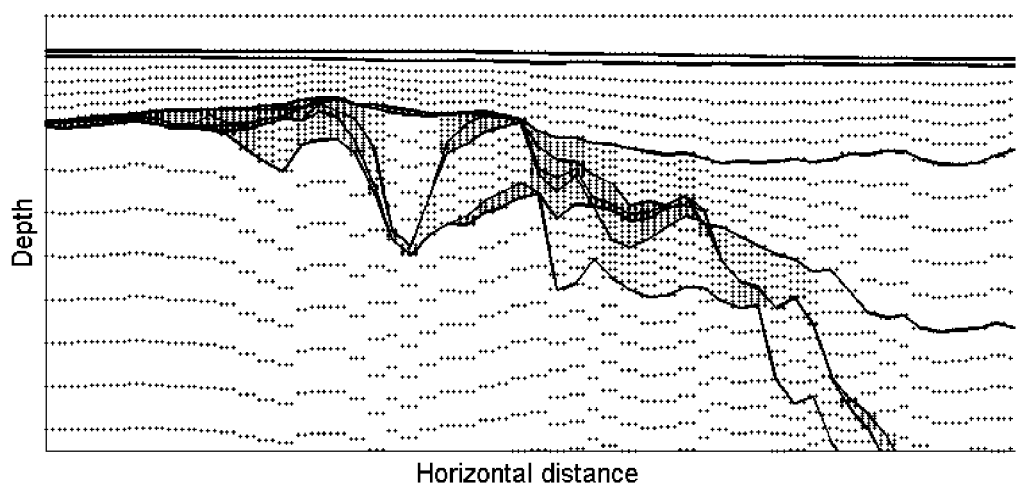
FIG. 1 illustrates model discretisation.

The inventors have appreciated that a shortcoming of the smoothing regularization schemes is that they do not represent the geological geometry. The smoothing regularization and, for example, the minimum vertical support regularization (Zhdanov et al.) do not take into account a priori geological information that may be available, for example from seismic data. The present application discloses a Tikhonov-type structural smoothing regularization approach that determines both the directionality and relative strength of the regularization from seismic data. The regularization is still of a smoothing nature, but acts mainly along the rock layers and layering, i.e. the stratigraphy. The inventors have appreciated that changes in electric parameters are structurally conform changes in the elastic parameters. This use of prior knowledge can improve the interpretation of mCSEM data because the result is more directly comparable to seismic data.

Herein disclosed is a method which includes at least two of the following three steps: first, the inversion parameters are designed to be conform with data representing stratigraphic surfaces in the earth. This step enables the model discretization to represent the geometry observed from the seismic data. The discretization is obtained by dividing the model into regular intervals horizontally, but not vertically. The vertical interval between each stratigraphic surface is divided into a pre-determined number of sub-layers. Thus, where the thickness of a layer is large, the inversion cells are set to be larger, and when the stratigraphic surfaces approach each other, the inversion cells are set to be smaller. By way of example of data representing stratigraphic surfaces, horizons may be used, which are interfaces indicative of a particular position in a stratigraphic sequence. Horizons may refer to boundaries between stratigraphic units, or to markers within those units.

Second, a spatially varying relative strength of the regularization is determined from a seismic chaos attribute. At locations where there is little noise or little uncertainty in the seismic data, for example along reflectors and homogeneous packages, a large weight is assigned to the regularisation term to ensure a smooth profile. At locations where there is more noise and a relatively large uncertainty in the seismic data, a correspondingly small weight is assigned to allow for more variations. Any attribute with similar properties may be used.

Thirdly, the smoothing direction is determined using the model discretization described in the first step. Structure from prior geophysical data is used to describe at each spatial point two new directions: along and orthogonal to the dip direction. A high dependency between neighbouring points along the dip direction and a low dependency between neighbouring point orthogonal to the dip direction can be enforced. The smoothing now acts mainly along each sub-layer, which by design follows the stratigraphy.

By way of example, an inversion algorithm is described as follows. The example illustrates a 2 dimensional model, but the example may also be generalised to a 3 dimensional model. The electromagnetic inversion problem is an optimisation problem: find the conductivity σ which minimises the functional (equation 1):

$$\epsilon(\sigma) = \|W(d-F(\sigma))\|_2^2 + \lambda^2 \epsilon^{reg}(g(\sigma))$$

In this functional, $g(\sigma)$ is an injective function for $\sigma>0$. These functions are usually chosen to make updates in specific ranges easier for the optimization algorithm or to resolve parameter scale issues, for example, $g=\sigma$, $g=\log \sigma$, $g=\sigma^{1/2}$. Further, $\lambda^2>0$ is a regularization parameter which controls the trade-off between the data fit and the regularizer, and $\epsilon^{reg}$ is a regularizing term to enforce specific properties in the solution. The data are gathered in the vector d, and F denotes the forward modelling operator. The data weights W are chosen according to Morton et al. (*CSEM data uncertainty analysis for* 3*D inversion: SEG*, 724-728).

If smoothing regularization is used, the regularization term in equation 1 may be chosen as (equation 2):

$$\epsilon^{reg}(g(\sigma)) = \beta\left(\left\|\alpha_x \frac{\partial}{\partial x} g(\sigma)\right\|_p^p + \left\|\alpha_z \frac{\partial}{\partial z} g(\sigma)\right\|_p^p\right)$$

In equation 2, $\alpha_x$, $\alpha_z$, $\beta \in \mathbb{R}$ and $\|.\|_p \in \mathbb{N}$ denote the common p-norm. For example, $\alpha_x \geq \alpha_z$, which enforces flatness.

The cost-functional as defined in equation 1 may be minimized iteratively using a Gauss-Newton algorithm. After a search direction is found by solving the equations, a line search with back-tracking may be performed to improve convergence.

Herein is illustrated how the structural regularization is set up using a field data example, for which the inversion results will also be illustrated. We assume that seismic data imaged in depth is available, together with interpreted horizons.

The model is first discretised. To obtain structurally regularized inversion results, a suitable model representation is chosen. The model is therefore discretised into inversion cells, each cell with constant conductivity, conform the interpreted horizons. The model is discretized into $N_x$ regular intervals with a fixed length in the horizontal direction, but are allowed to vary in the vertical direction. At each vertical profile, the vertical interval between each horizon is divided into a predetermined number of inversion cells. Thus, when the distance between the horizons is large, the cells become wide, and when the horizons approach each other, the cells become smaller. This constructs sub-layers in between the horizons that follow the structure, and has the property that each horizontal location has the same number of grid cells, $N_z$, vertically. When horizons come too close together such that the inversion cells become smaller than the modelling grid size, they are removed from the inversion grid. This removal is justified because they have become too small to resolve with mCSEM data on the chosen modelling grid. An example of a model discretization is shown in FIG. 1. The vertical axis indicates the depth and the horizontal axis indicates the horizontal distance.

Figure 2:
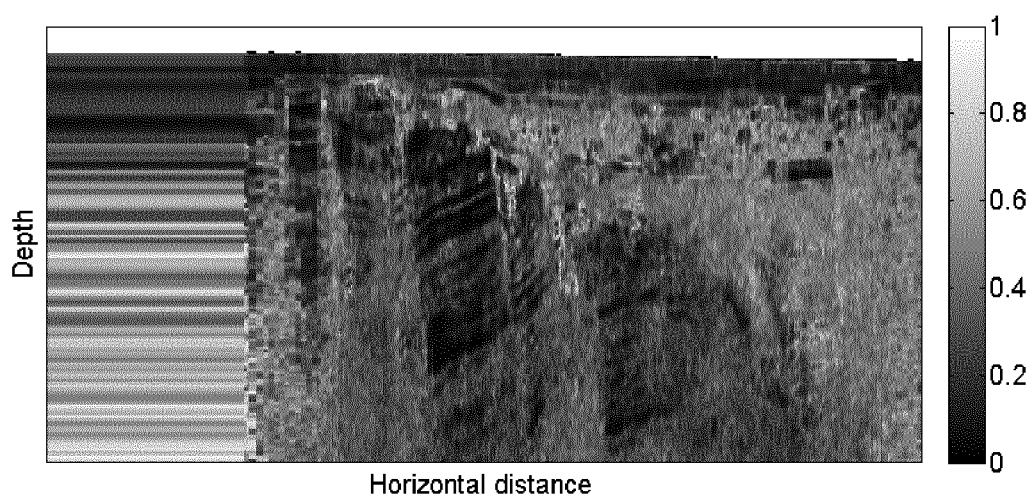
FIG. 2 illustrates output from a seismic chaos filter.

The spatially varying relative strength of the regularization, $\beta$, is determined from the seismic chaos attribute. Now $\beta: R^n \rightarrow R$, rather than $\beta \in R$, where n is the dimension of the resistivity model. For each sample in a seismic cube it associates a number $0 \leq c \leq 1$, which describes the local chaotic behaviour. Here, $c=0$ is no chaos or uncertainty, while $c=1$ is complete chaos. The output of this filter is shown in FIG. 2, The output from the chaos filter is then mapped onto a spatially varying function $\beta$ according to $$\beta = Ke^{-5c^2}$$

where K controls the absolute level. The factor −5 in the exponent was chosen by inspection, and is found to give a good separation between high values and low values. Further, we must have $\beta > 0$ to maintain non-singular equations. Thus, $\beta$ also has a threshold from below. It was also appreciated that associating low $\beta$-values at grid cells intersected by horizons has a positive effect on the estimation, and encourages contrasts at these locations. Finally, a Gaussian running averaging filter was applied for smoothing.

Figure 3:
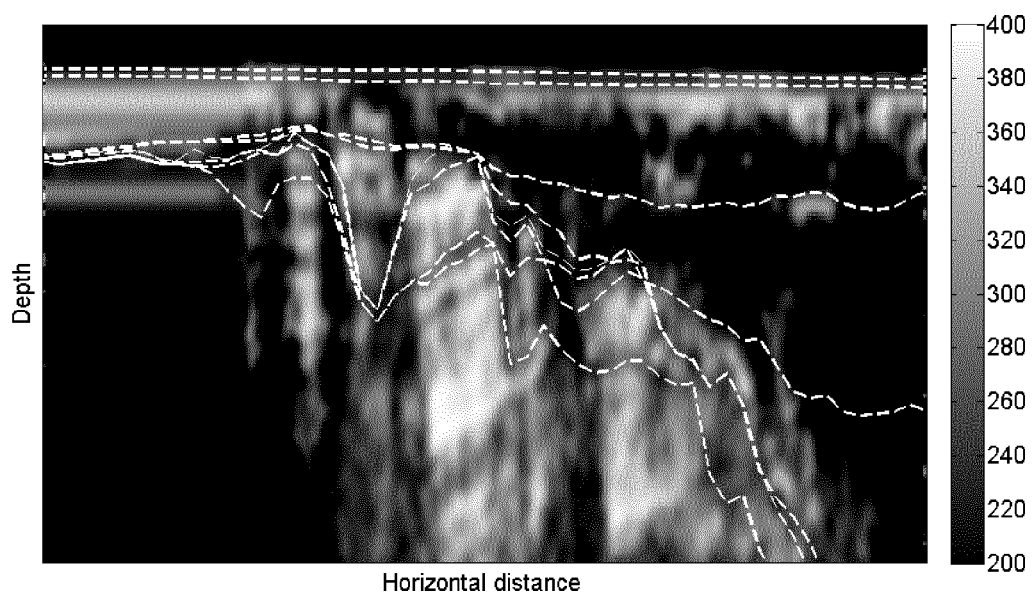
FIG. 3 illustrates a β function used to describe relative regularisation strength.

A small value of $\beta$ means that we expect the chaotic behaviour in the seismic to imply also a less smooth variation of the conductivity. On the other hand, where there is little chaos in the seismic data we expect a smoother resistivity profile. The final $\beta$-function used is shown in FIG. 3. This example for the construction of $\beta$ is specific, but the inventors have appreciated that there are many different ways to construct $\beta$ such that high values of $\beta$ are assigned to locations with low chaos and low values of $\beta$ are assigned to locations with high chaos.

Alternatively, the spatially varying weights $\beta$ which are assigned to locations may be chosen such that weights with horizons passing through them are lower than weights assigned to locations without horizons passing through them.

The regularisation term in equation 1 may also be modified. This modification may be assigned in addition to the spatially varying relative strength of the regularization, or instead of the spatially varying relative strength.

A new regularisation term is defined as (equation 3):

$$\epsilon^{reg}(g_2(\sigma)) = \beta \left( \left\| \alpha_{x'} \frac{\partial}{\partial x'} g_2(\sigma) \right\|_p^p + \left\| \alpha_{z'} \frac{\partial}{\partial z'} g_2(\sigma) \right\|_p^p \right)$$

In equation 3, x' and z' are new horizontal and vertical directions to be specified according to the new model discretisation. The difference with equation 2 is that in equation 3 the smoothing in the horizontal and vertical direction is coupled to define a direction, and that the weights vary spatially in a way consistent with seismic information. The smoothing direction is determined, for example, from seismic horizons. Grid points at the horizons are given the direction of the tangent of the horizon. The direction associated with a grid point in-between horizons is interpolated between the tangents of the horizons immediately above and below. For some applications, it may be favorable to use only the tangent from the horizon above, while as other times only the one below. However, to ensure a smoothly varying direction, a linear interpolation with respect to the vertical distance is the default. The definition of the new horizontal and vertical directions in equation 3 correlates neighbouring geological locations in dependence on the presence of a structural gradient estimated from prior knowledge of said structure.

Figure 4:
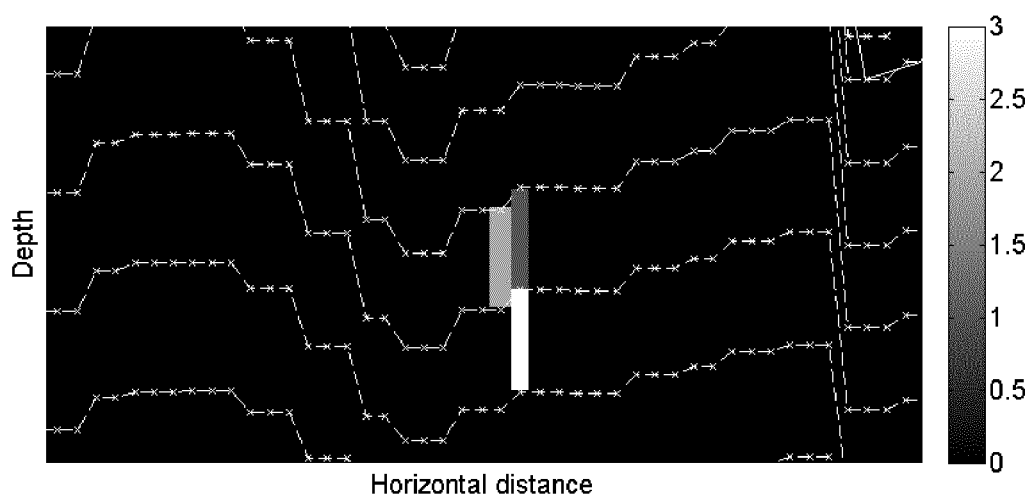
FIG. 4 illustrates an example of regularisation.

The derivative for a conductivity model $\sigma$ is further defined, discretised onto the inversion grid evaluated in the grid point ix, iz as $$\frac{\partial}{\partial x'} g_2(\sigma(ix, iz)) = \frac{g_2(\sigma(ip_x(ix, iz), ip_z(ix, iz))) - g_2(\sigma(ix, iz))}{\Delta x'},$$

$$\frac{\partial}{\partial z'} g_2(\sigma(ix, iz)) = \frac{g_2(\sigma(iq_x(ix, iz), iq_z(ix, iz))) - g_2(\sigma(ix, iz))}{\Delta z'},$$

where $ip_x$, $ip_z$, $iq_x$, $iq_z$ are indexing arrays of dimension $N_x \times N_z$ describing which inversion grid cell we shall regularize against, and $\Delta x'$ and $\Delta z'$ are mesh sizes in the new model discretization. The indexing arrays $ip_x$, $ip_z$ now determines the new horizontal direction within the sub-layer specified by the model discretization, and $iq_x$, $iq_z$ does the same for the new vertical direction. These arrays have to take into account that some of these cells may disappear when horizons come too close, and re-appear when they diverge again. In such situations the indexing is not to a cell's immediate neighbor in the sublayer. An example of the regularization for a given cell is shown in FIG. 4.

We observe that if we choose a regular inversion grid, and define element (ix, iz) in the indexing arrays as $$ip_x(ix,iz)=ix+1,$$

$$ip_z(ix,iz)=iz,$$

$$iq_x(ix,iz)=ix,$$

$$iq_z(ix,iz)=iz+1,$$

we obtain the smoothing regularization in equation 2 approximated using forward differences. The smoothing regularization is a special case of the more general indexing strategy.

Figure 5:
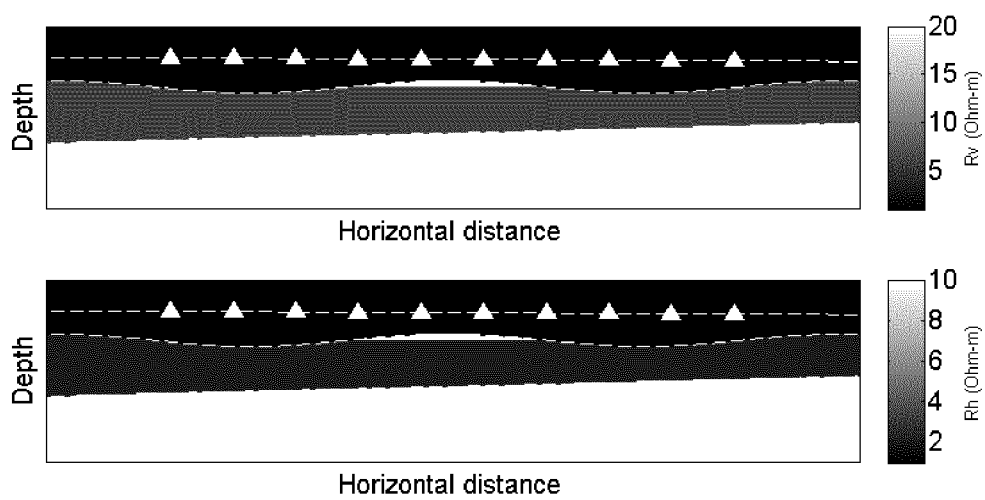
FIG. 5 illustrate a true model in a synthetic example.

The result of a calculation based on the specific embodiments discussed above is now presented. The synthetic model we use is shown in FIG. 5. It consists of a gently dipping seabed, an oscillating subsurface interface and a straight, dipping subsurface interface. The uppermost subsurface layer is isotropic with resistivity Rh=Rv=1 Ohm-m. The next two layers are anisotropic with horizontal and vertical resistivities Rh=2 Ohm-m and Rv=6 Ohm-m, and Rh=10 Ohm-m and Rv=20 Ohm-m, respectively. The water is chosen isotropic with Rh=Rv=0.3125 Ohm-m. At approximately 1000 m depth below sea surface an isotropic 50 Ohm-m reservoir is positioned. This model allows testing of the regularization scheme on both plane and curved interfaces, how it deals with thin resistors, and comparing it against the conventional regularization.

Figure 6:
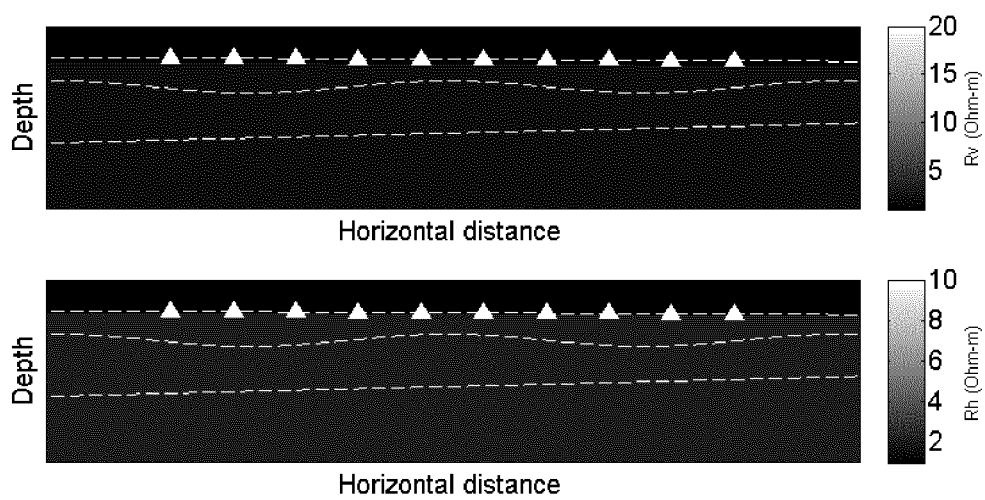
FIG. 6 illustrates an initial model in a synthetic example.

The input data are inline electric fields recorded at the 10 receivers, spaced 1 km apart. Offsets ranging from 2-10 km was used on each receiver, with a noise floor at $10^{-15}$ V/Am$^2$ and 5% Gaussian noise added. The source elevation was 30 m above the seabed, and frequencies of 0.25, 0.5, 1 Hz were used. For this example, $\alpha_x=1$, $\alpha_z=0.03$, p=1, and $g(\sigma)=\sqrt{\sigma}$. The regularization strength, $\lambda^2$ was reduced by 5% in each iteration until the RMS misfit normalized against the added noise passed below 1. The initial model was chosen as an isotropic 2 Ohm-m half space model, shown in FIG. 6. This example is a synthetic example.

Figure 7:
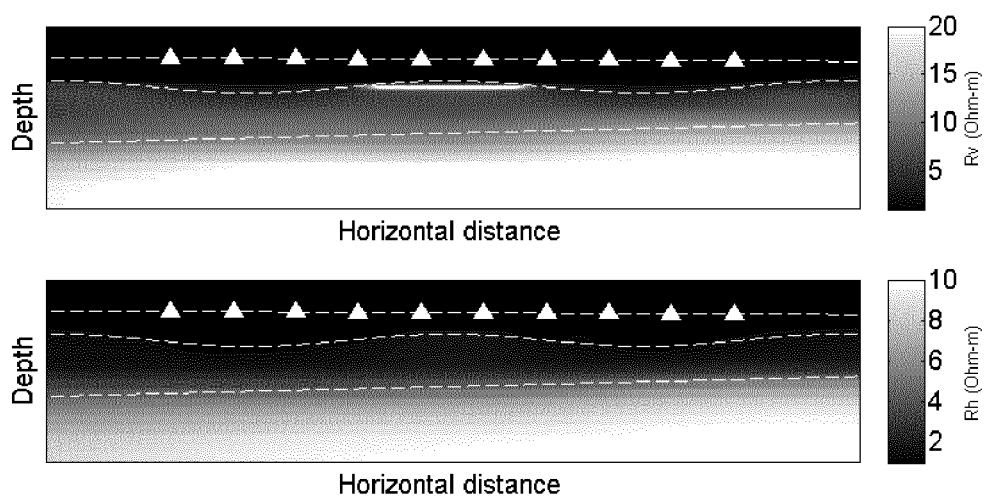
FIG. 7 illustrates a result of smoothing regularisation.
Figure 8:
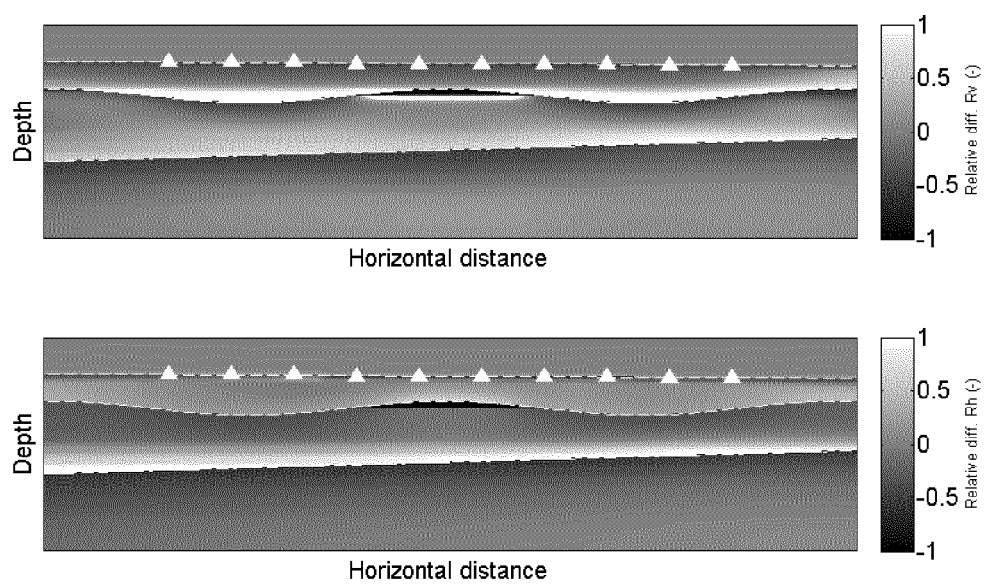
FIG. 8 illustrates a relative difference between the result of smoothing regularization and true model on synthetic example.
Figure 9:
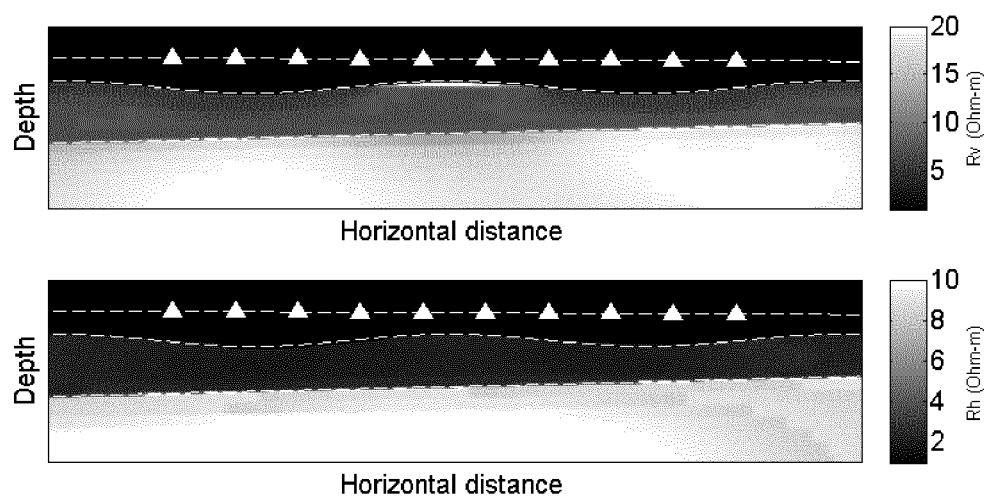
FIG. 9 illustrates a result of structural regularization on a synthetic example.
Figure 10:
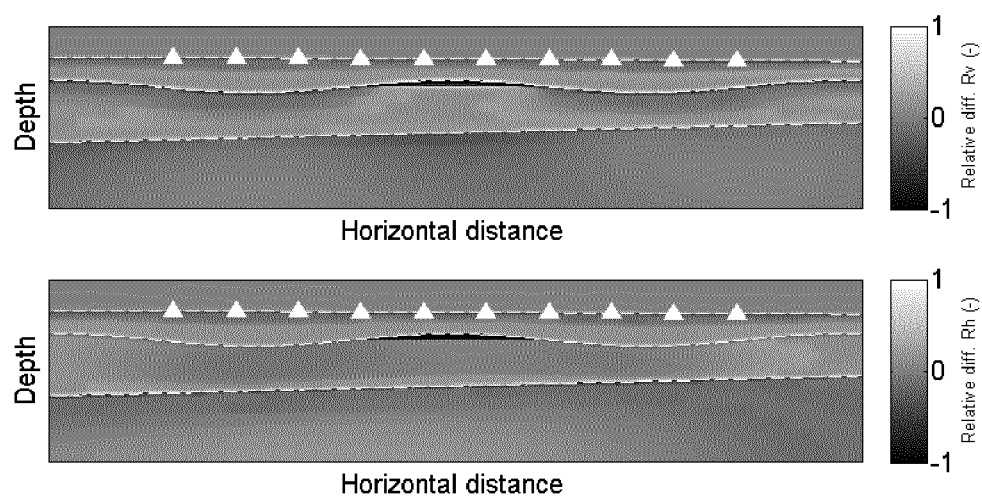
FIG. 10 illustrates a relative difference between the result of structural regularization and true model on synthetic example.

FIG. 7 shows the result from inversion with the smoothing regularization, while FIG. 8 shows the relative difference between the inversion result in FIG. 7 and the true model in FIG. 5. The corresponding figures for the structural regularization is shown in FIGS. 9 and 10. Comparing the inversion results in FIGS. 7 and 9, we observe that although the smoothing regularization is able to mimic the main trends, the structural regularization result has sharper interfaces. Further, especially at the deepest interface, the horizontal smoothing in the regularization degrades the result. The RMS misfit for the smoothing regularization was 4.9%, while for the structural regularization it is 5.0%. Also, the regularization places the resistor slightly wrong in depth. All results match the data to the uncertainty level.

Comparing the relative difference images in FIGS. 8 and 9, the effect of the regularizer is even more prominent. Focusing on the oscillating interface in FIG. 8, we observe that the errors following the smoothing horizontally, while in FIG. 10 is follows the interface. Moreover, the errors are generally lower in the structural regularization. This is due to the a priori information about the interfaces being correct, thereby enabling a more accurate image of the true model.

Figure 11:
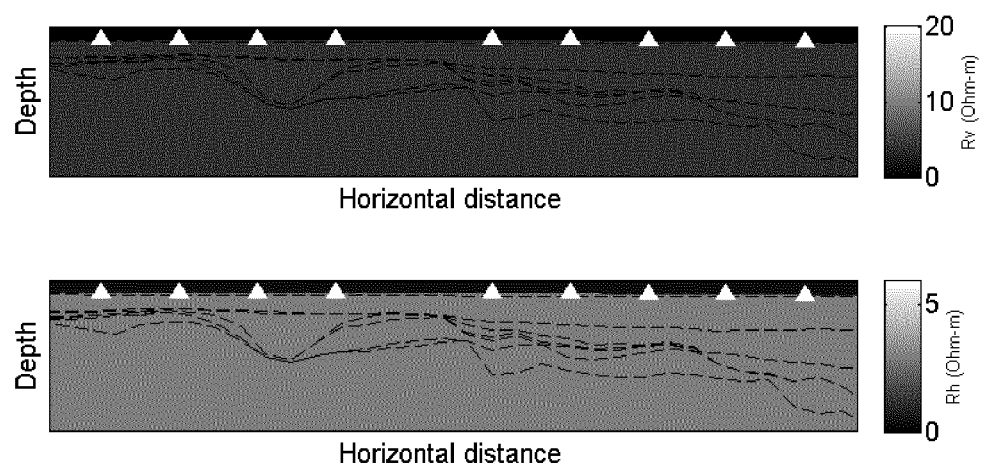
FIG. 11 illustrates an initial half space model used in the inversion.

A further example is illustrated for real CSEM survey results. For this example we have chosen $\alpha_x=1$, $\alpha_z=0.1$, p=1, and $g(\sigma)=\sqrt{\sigma}$. The line consists of 9 receivers, the horizontal dipole source was towed approximately 30 m above the seabed, and the inversion was run using frequencies 0.2 Hz and 0.4 Hz. The initial model was the anisotropic half space model shown in FIG. 11. The inversions ran until the backtracking algorithm could not find a better data fit. The regularization strength, $\lambda^2$ was reduced by 5% in each iteration until the RMS misfit normalized against the assumed measurement uncertainty passed below 1.

Figure 12:
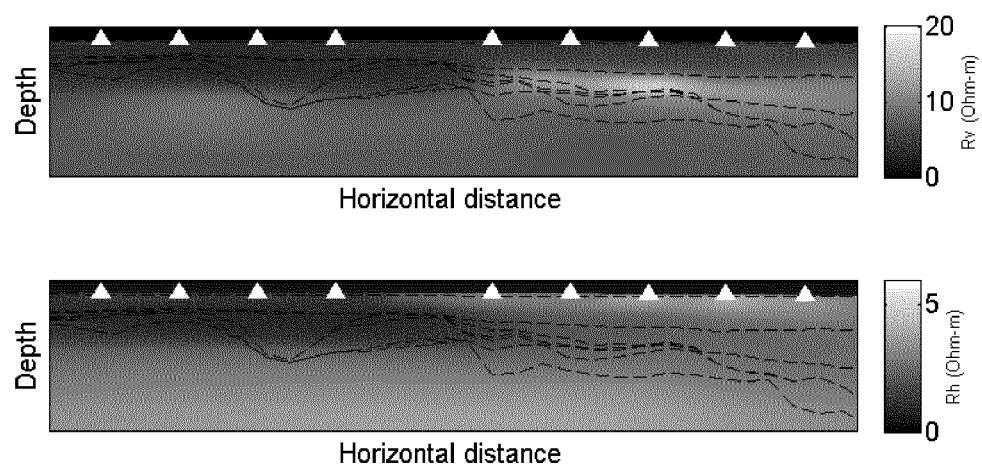
FIG. 12 illustrates inversion results using smoothing regularization. Top panel: vertical resistivity, bottom panel: horizontal resistivity.

FIG. 12 shows the results with regularization using inline data. We observe a clear anomaly at approximately 1800 m depth. The center of the anomaly is slightly shifted from the apex of the structure and it is very smeared out laterally. It is difficult to say whether it is associated with higher resistivity in an entire package, a more localized resistivity anomaly, or both. Further, in the lower parts of the section the resistivity variations cuts across the interpreted horizons. The RMS misfit for the inversion is 2.8%, below the assumed uncertainty level of the data of 4-5%.

Figure 13:
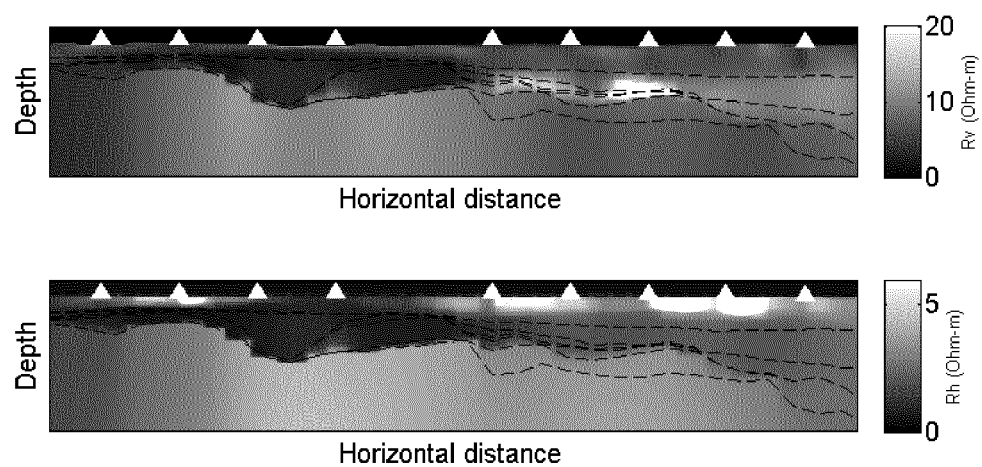
FIG. 13 illustrates inversion results using structural smoothing regularization. Top panel: vertical resistivity, bottom panel: horizontal resistivity.

In FIG. 13, we show the result of our structural regularization with inline electric field data. We now see that that the main anomaly is split into three anomalies, each with higher resistivity than before. This indicates that it is not an increased resistivity in the entire layer, but rather localized anomalies. This is in compliance with the interpretation from seimic data. The effect of the regularization is clearly visible in that now the inverted resistivity profile follows the geometry dictated by the seismic horizons. The RMS misfit for the inversion is 3.2%.

Figure 14:
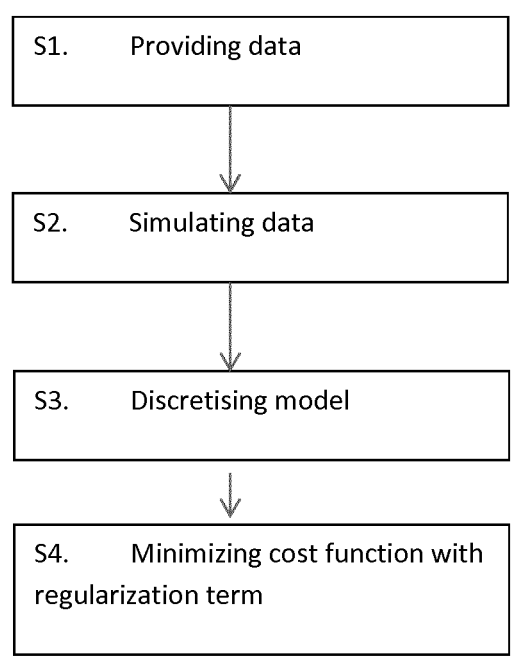
FIG. 14 is a flow diagram of an estimation method.

FIG. 14 illustrates schematically the method of estimating electromagnetic parameters of a geological structure discussed above, comprising the steps of providing controlled source electromagnetic, CSEM, data of the structure (S1), calculating a numerical model representing electromagnetic parameters of the structure and generating simulated CSEM data (S2), discretising the numerical model based on prior knowledge of the structure (S3) and minimising the cost function (S4) with a regularisiation term which depends on prior knowledge of the structure.

Figure 15:
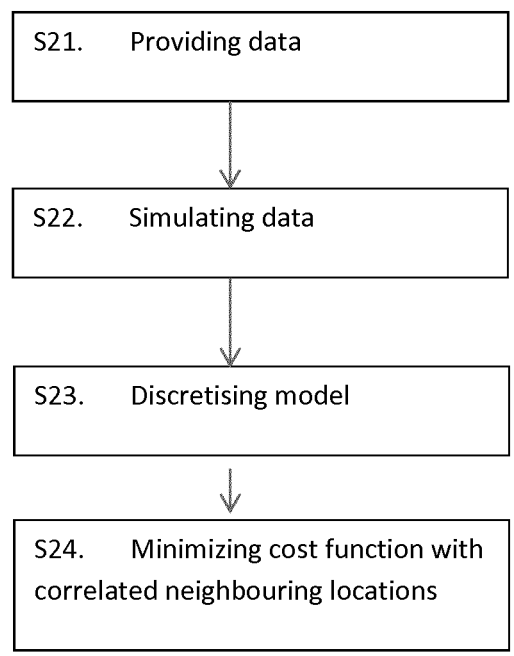
FIG. 15 is a flow diagram of an estimation method.

FIG. 15 illustrates schematically the method of estimating electromagnetic parameters of a geological structure discussed above, comprising the steps of providing controlled source electromagnetic, CSEM, data of the structure (S21), calculating a numerical model representing electromagnetic parameters of the structure and generating simulated CSEM data (S22), discretising the numerical model based on prior knowledge of the structure (S23) and minimising the cost function (S24) comprising terms correlating neighbouring geological locations in dependence on prior knowledge of said structure.

Figure 16:
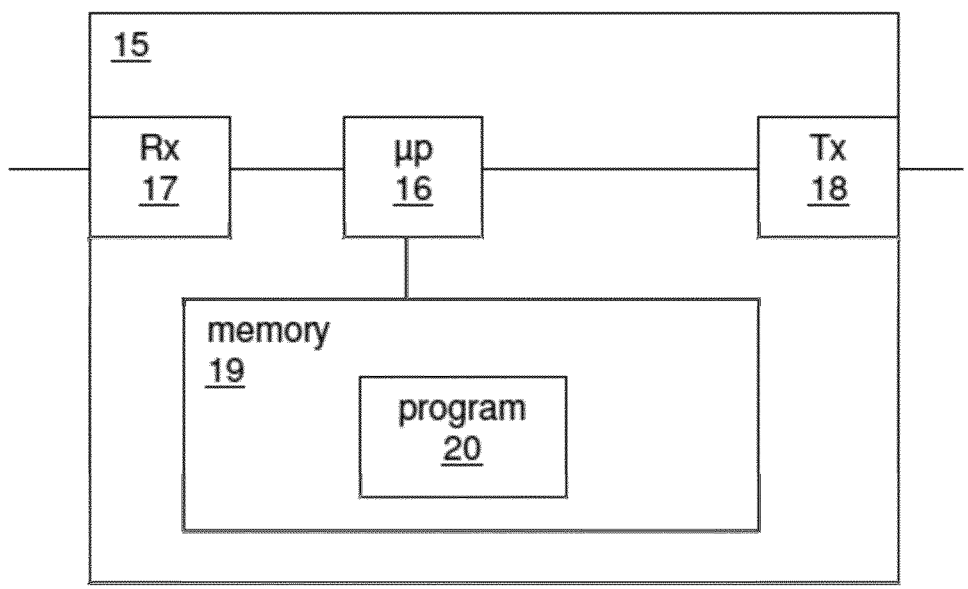
FIG. 16 is a schematic illustration of a computer.

FIG. 16 illustrates schematically in a block diagram a computer device (15) that is arranged to carry out the method disclosed above. The computer device is provided with a processor (16) and a receiver (17) for receiving controlled source electromagnetic, CSEM, data of the structure. On the basis of the received data and a model, the processor makes an estimate of parameters of the geological structure. A transmitter (18) is provided for providing an output of the estimated parameters.

A non-transitory computer readable medium in the form of a memory (19) may also be provided that can be used to store data. It may also be used to store a computer program (20) which, when executed by the processor, causes the computer device to behave as described above.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of identifying presence of hydrocarbons in a geological structure, comprising the steps of:
    performing a survey to collect controlled source electromagnetic (CSEM) data of the geological structure;
    calculating a numerical model of the geological structure;
    spatially discretising the numerical model based on prior knowledge of stratigraphic horizons of the geological structure, by dividing the model into regular intervals horizontally and by dividing a vertical interval between each stratigraphic horizon into a pre-determined number of sub-layers;
    defining a first spatial direction in the tangential plane of said structure and a second spatial direction perpendicular to the tangential plane of said structure, wherein the first and second spatial directions are chosen according to said step of discretising the numerical model;
    defining a functional for determining the distance between simulated CSEM data and the collected CSEM data, wherein the functional comprises terms correlating neighbouring geological locations in dependence on the spatially discretised model so that a high correlation is assigned to neighbouring locations in the first spatial direction and a low correlation is assigned to neighbouring locations in the second spatial direction;

using an iterative procedure to determine electromagnetic parameters of the geological structure that minimize said functional; and using the determined electromagnetic parameters to identify presence of hydrocarbons in the geological structure.

2. The method of claim 1, wherein said prior knowledge comprises seismic survey data.

3. The method of claim 1, wherein the electromagnetic parameters are the conductivity of the geological structure at a plurality of locations of the structure.

4. The method of claim 1, wherein the method is performed by a computer device comprising:

a receiver for receiving controlled source electromagnetic, CSEM, data of a geological structure; and a processor arranged to carry out the method.

* * * * *